(12) United States Patent
Adiletta

(10) Patent No.: US 6,387,143 B1
(45) Date of Patent: May 14, 2002

(54) INTERNAL COMBUSTION ENGINE EXHAUST FILTERS

(75) Inventor: Joseph G. Adiletta, Thompson, CT (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/720,195

(22) PCT Filed: Jun. 25, 1999

(86) PCT No.: PCT/US99/14356

§ 371 Date: Jul. 12, 2001

§ 102(e) Date: Jul. 12, 2001

(87) PCT Pub. No.: WO00/00721

PCT Pub. Date: Jan. 6, 2000

Related U.S. Application Data

(60) Provisional application No. 60/090,910, filed on Jun. 26, 1998.

(51) Int. Cl.[7] ................................................. B01D 46/00
(52) U.S. Cl. ............................. 55/497; 55/498; 55/501; 55/502; 55/527
(58) Field of Search ........................... 55/497, 500, 502, 55/511, 521, 498, 501, 527

(56) References Cited

U.S. PATENT DOCUMENTS

| | | | | |
|---|---|---|---|---|
| 1,832,281 A | * | 11/1931 | Davies | |
| 4,133,661 A | * | 1/1979 | Strnad | |
| 4,177,050 A | * | 12/1979 | Culbert et al. | |
| 4,184,966 A | * | 1/1980 | Pall | |
| 4,386,948 A | * | 6/1983 | Choksi et al. | |
| 4,617,122 A | * | 10/1986 | Kruse et al. | |
| 4,865,803 A | * | 9/1989 | Dillmann et al. | |
| 5,273,563 A | * | 12/1993 | Pasch et al. | |
| 5,674,302 A | * | 10/1997 | Nakayama et al. | |
| 5,720,790 A | * | 2/1998 | Kometani et al. | |
| 5,885,455 A | * | 3/1999 | Graus et al. | |
| 6,126,707 A | * | 10/2000 | Pitzen | |

* cited by examiner

Primary Examiner—Duane S. Smith
(74) Attorney, Agent, or Firm—Leydig, Voit & Mayer, Ltd.

(57) ABSTRACT

An engine exhaust filter system comprises a housing and a pleated filter element. The housing includes an inlet and an outlet and defines an exhaust flow path between the inlet and the outlet. The pleated filter element is disposed in the exhaust gas flow path between the inlet and the outlet. The pleated filter element includes a filter medium and at least a first perforated support member, the filter medium being disposed adjacent to the perforated filter support member. The filter medium includes a portion extending beyond the perforated support member comprising a seal that prevents or reduces bypass of unfiltered exhaust gas around the pleated filter element.

17 Claims, 7 Drawing Sheets

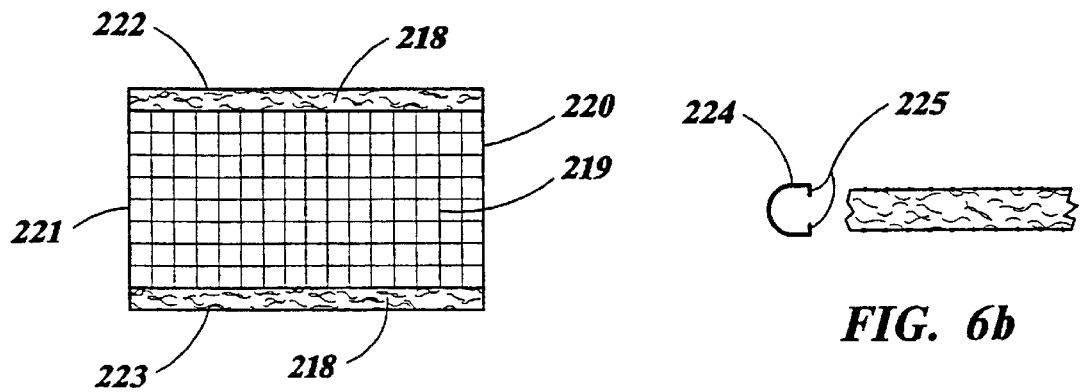
FIG. 6a
FIG. 6b
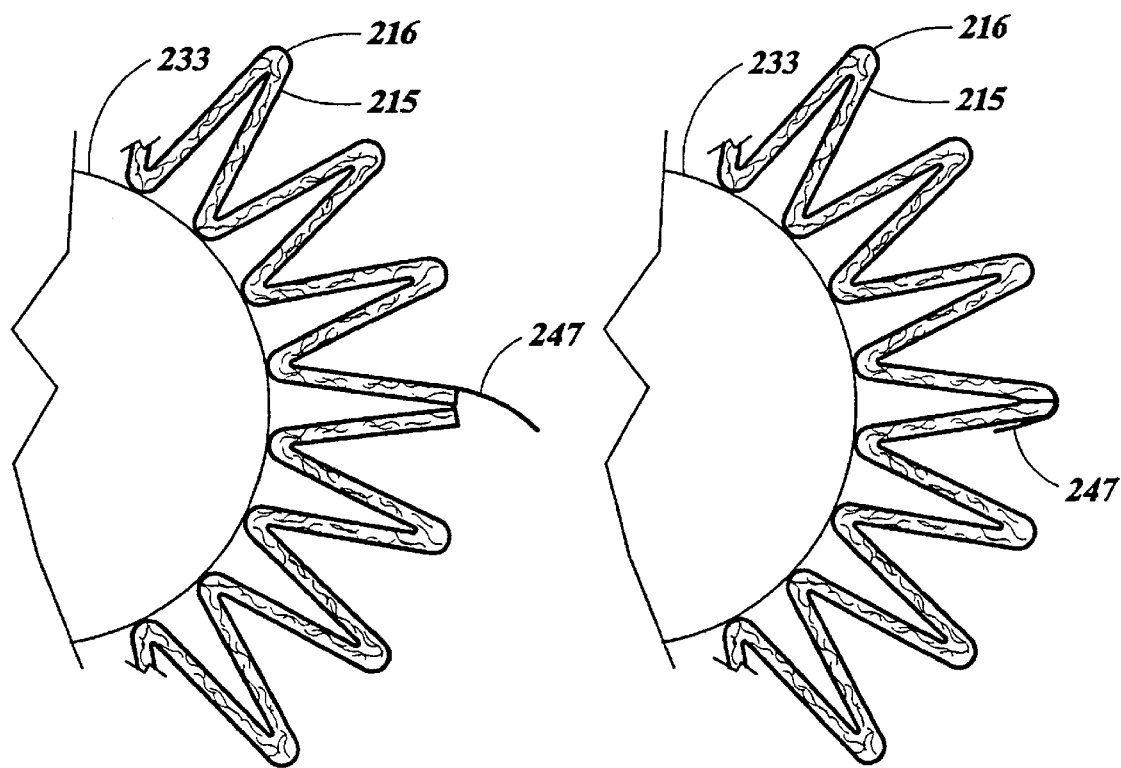
FIG. 6c  FIG. 6d

INTERNAL COMBUSTION ENGINE EXHAUST FILTERS

This application is a 35 U.S.C. 371 of PCT/US99/14356 filed Jun. 25, 1999. This application claims the priority of U.S. provisional patent application 60/090,910, filed Jun. 26, 1998, which application is incorporated by reference in its entirety.

FIELD OF THE INVENTION

The present invention relates to filter systems for purifying the exhaust gases of internal combustion engines.

BACKGROUND OF THE INVENTION

A typical engine exhaust filter system includes a housing, which has an inlet and an outlet and defines an exhaust flow path, and a filter element disposed in the exhaust flow path to trap pollutants such as particulate materials and to prevent them from being discharged into the atmosphere. The exhaust gas of an internal combustion engine may enter the filter system through the inlet, pass through the filter element, and exit the housing through the outlet. An engine exhaust filter system generally uses seals to prevent bypass of the exhaust gas around the filter element.

A challenge facing the designers of engine exhaust filter systems is to find suitable seal materials. Seals used in exhaust filter systems are exposed to severe operating conditions. For example, the filtration of the engine exhaust gases may occur at high temperatures, such as temperatures of 400° F. or greater. A regenerative exhaust filter system for diesel engines may produce even higher temperatures, which are generally 1,000° F. or greater. Diesel exhaust filter systems are used to trap pollutants such as soot particles in the exhaust gases. As the particulates accumulate in the filter system, they may clog the filter and increase the resistance of the filter to exhaust flow, resulting in excessive engine back pressure. Excessive engine back pressure can lead to an increase in fuel consumption, and, in extreme cases, to engine shut-off or failure. Thus, it is desirable to intermittently regenerate the filter to remove the particulates, for example, by combusting the particulates at temperatures of 1,000° F. or greater.

Seal materials in exhaust filter systems may also experience chemical corrosion. Engine exhaust gases may contain chemicals such as acid-forming gases, which may be very corrosive when combined with high temperatures. Corrosion may shorten the usefull life of the seals, creating leakage in the exhaust filter systems.

Another challenge facing the designers of engine exhaust filter systems is to design exhaust filter seals that are strong and reliable. The reliability of the seals is important because if the seals fail, the pollutants will be able to bypass the filter element and will be discharged into the atmosphere.

The seal materials commonly used in Diesel exhaust filter systems often cannot meet the requirements of heat or chemical resistance. For example, adhesives used to seal the filter element generally cannot withstand the operating temperature and chemical corrosion for the entire life of the filter system, and leakage often occurs as a result.

SUMMARY OF THE INVENTION

The present invention overcome many of the problems of conventional exhaust filter systems.

According to one aspect of the invention, an engine exhaust filter comprises a housing and a pleated filter element. The housing includes an inlet and an outlet and defines an exhaust gas flow path between the inlet and the outlet. The pleated filter element is disposed in the exhaust gas flow path, and includes a filter medium and at least first perforated filter support member. The pleated filter element comprises materials that are resistant to temperatures of 400° F. or greater. The filter medium is disposed adjacent to the first perforated filter support member, and includes a portion that extends beyond the first perforated filter support member. The extended portion of the filter medium comprises a seal that prevents or reduces unfiltered exhaust gas bypass of the filter element.

According to another aspect of the invention, an engine exhaust filter comprises a housing, a pleated filter element and a compression assembly. The housing includes an inlet and an outlet and defines an exhaust gas flow path between the inlet and the outlet. The pleated filter element is disposed in the exhaust gas flow path and includes a filter medium and at least a first perforated filter support member. The pleated filter element comprises materials that are resistant to temperatures of 400° F. or greater. The filter medium is disposed adjacent to the first perforated filter support member and includes a portion that extends beyond the first perforated filter support member. The compression assembly compresses the extended portion of the filter medium such that the filter medium comprises a seal. The seal prevents or reduces unfiltered exhaust gas bypass of the filter element.

BRIEF DESCRIPTION OF THE DRAWINGS

FIG. 6a is a top view of an exemplary filter pack composite according to one aspect of the invention;

FIG. 6b is a top view of an alternate embodiment of a filter pack composite of FIG. 7;

FIG. 6c is a cross-sectional view of an exemplary corrugated filter pack prior to side sealing;

FIG. 6d is a cross-sectional view of a corrugated filter pack after side sealing.

DETAILED DESCRIPTION OF THE EMBODIMENTS

Figure 1:
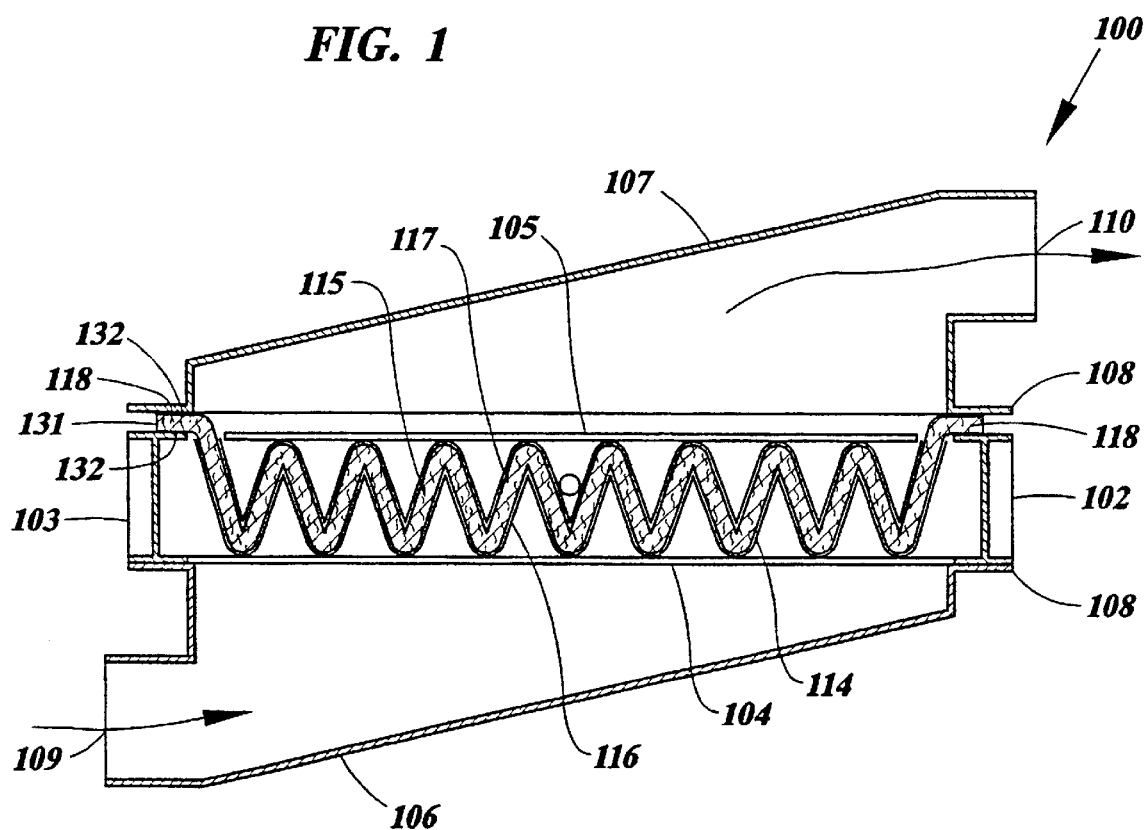
FIG. 1 is a side view of an exemplary filter system embodying the present invention.

As shown in FIGS. 1, 2, 4 and 5, an engine exhaust filter system 100, 200 according to the present invention may comprise a housing 102, 202, a filter element 114, 214 disposed in the housing 102, 202 and a compression assembly 130, 230. The housing 102, 202 may include an inlet 109, 209 and an outlet 110, 210 and may define an exhaust gas flow path that provides fluid communication between the inlet 109, 209 and the outlet 110, 210. The filter element 114, 214 may be disposed in the exhaust gas flow path. Alternatively, the housing may include a plurality of inlets and a plurality of outlets and may define a plurality of exhaust gas flow paths, and a filter element may be disposed in each of the exhaust gas flow paths.

The housing may have any desired configuration that defines an exhaust gas flow path. The inlet and outlet may be placed at any suitable locations on the housing such that the housing can be conveniently connected to the rest of the engine exhaust system. The inlet and outlet may be unitarily formed with the housing or, alternatively, they may be separate parts that are attached to the housing.

Figure 2:
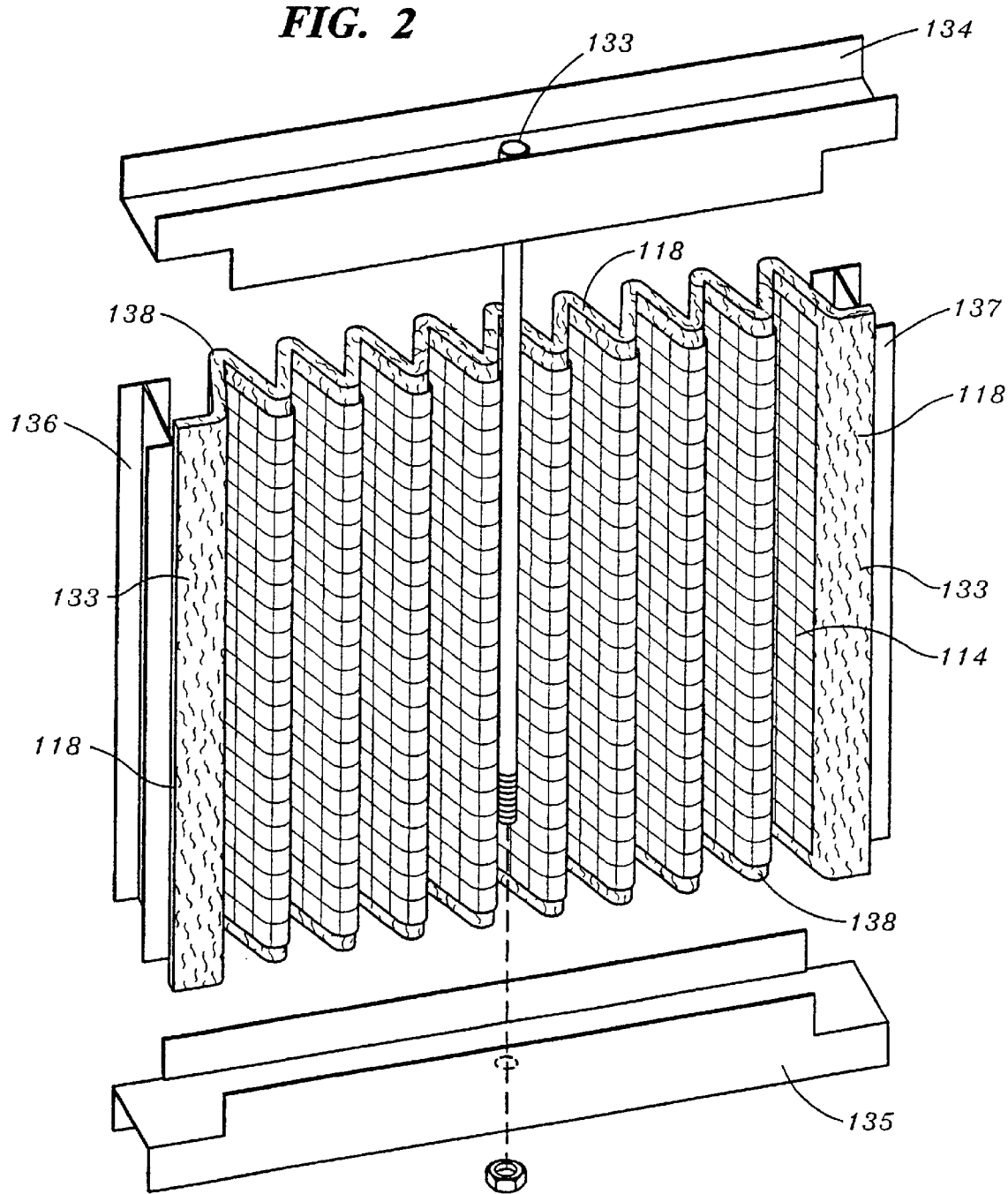
FIG. 2 is a side view of the filter element of the embodiment shown in FIG. 1

For example, referring to FIG. 1, a housing 102 for an engine exhaust filter system 100 embodying the present invention may include a hollow, parallelepipedal body 103, which has two opposite open sides 104, 105, and two housing caps 106, 107 covering the two open sides 104, 105, respectively. The parallelepipedal body 103 may be a unitary part, or as shown in FIG. 2, it may be constructed with I-beams and/or C-beams and secured by one or more tie rods or by any other suitable means such as welding or bonding. The housing caps 106, 107, preferably rectangular, may be attached to the parallelepipedal body 103 by any suitable means. For example, each of the housing caps 106, 107 may be provided with outwardly extending flange 108 along its periphery and the flange 108 may be attached to the parallelepipedal body 103 by any suitable fastening devices such as bolts or clamps. An inlet 109 is preferably located on one of the housing caps 106, 107 and an outlet 110 is preferably located on the other housing cap, although the inlet 109 and the outlet 110 may be located at any convenient locations on the housing 102. The exhaust gas may enter the housing 102 through the inlet 109, pass through the hollow, parallelepipedal body 103 from one of its open sides 104, 105 to the other open side 104, 105, and exit the housing 102 through the outlet 110. Therefore, the exhaust gas flow path of the filter system 100 maybe defined by the hollow, parallelepipedal body 103, and may provide fluid communication between the inlet 109 and the outlet 110.

The filter element, preferably pleated, may include a filter medium and at least one filter support member disposed adjacent to the filter medium. Preferably, the filter element includes at least two filter support members to provide better support to the filter medium and better drainage, and the filter medium is disposed between and supported by the two filter support members. The size of the filter element, the number of pleats per unit length and the height of the pleats depend on the desired surface area of the filter. For example, the number of pleats per inch may be in the range from about 2.5 per inch to about 8 per inch, and the height of the pleats may be from about 0.5 inch to about 3 inches. The preferred number of pleats per inch is about six.

According to an aspect of the present invention, the filter medium preferably is slightly larger than the filter support members such that when the filter medium is disposed adjacent to a filter support member or between two filter support members, a portion of the filter medium extends beyond the filter support members. The extended portion of the filter medium may serve as a seal. Such a seal may be used in place of a conventional sealing means such as a gasket seal or high temperature adhesive, or it may be used in addition to a conventional sealing means to provide additional sealing security. The use of the seal will be discussed in detail in the description of the compression assembly.

The filter element may be variously configured, depending on the configuration of the engine exhaust filter system. In the embodiment shown in FIGS. 1 and 2, for example, a pleated filter element 114 is disposed in the housing 102, in particular, in the parallelepipedal body 103. The filter element 114 comprises a filter medium 115 and two filter support members 116, 117. Preferably the filter medium 115 is slightly larger than the filter support members 116, 117 such that when the filter medium 115 is disposed between the filter support members 116, 117, a portion 118 of the filter medium 115 extends beyond the filter support members 116, 117 on at least one side of the filter element 114, preferably on two opposite sides and more preferably on all four sides. The extended portion 118 of the filter medium 115 can function as a seal which may seal the gap between the filter element 114 and the inner wall of the housing 102, thus preventing or reducing exhaust gas bypass of the filter element 114. The size of the extended portion may vary depending on various factors, such as the filter medium material and the thickness of the filter medium. The preferred size of the extended portion for the embodiments shown in FIGS. 1 and 2 is about 0.25 inch.

The compression assembly may be used to compress the extended portion of the filter medium to form a seal that, alone or together with a conventional seal such as a gasket seal or high temperature adhesive, prevents or reduces bypass of the exhaust gas around the filter element. The extended portion of the filter medium may be compressed in a variety of ways. For example, the elements of the filter housing may be used to compress the extended filter medium, or a separate device may be used. Thus, the compression assembly may have a variety of configurations.

In the embodiment shown in FIGS. 1 and 2, for example, the compression assembly 130 includes the parallelepipedal body 103, the two housing caps 106, 107 and one or more tie rods 133, all of which are elements of the housing 102. The extended portion 118 of the filter element 114 has an end surface 131 and two side surfaces 132, any of which may function as a seal when compressed. For example, on each of the two pleat sides 133 of the filter element 114, which are the sides that are parallel to the pleats, the two side surfaces 132 of the extended portion 118 maybe sealing compressed between the flange 108 of one of the housing caps 106, 107 and the parallelepipedal body 103 to seal the pleat sides 133 of the filter element 114 against the inner wall of the housing 102. Although FIGS. 1 and 2 show that the flange 108 of the same housing cap 107 compresses both pleat sides 133 of the filter medium 115 against the same side 105 of the parallelepipedal body 103, each pleat side 133 of the filter medium 115 may be compressed by a different housing cap 106, 107 against a different side 104, 105 of the parallelepipedal body 103. On the two end sides 138 of the filter element 114, which are the sides that are perpendicular to the pleats, the end surfaces 131 of the extended portion 118 are compressed by one or more tie rods 133 between the two I-beams 134, 135 disposed at the end sides 138 of the filter element 114, which seals the end sides 138 of the filter element 114 against the inner wall of the housing 102. Preferably the I-beams 136, 137 disposed at the pleat sides 133 of the filter element 114 are dimensioned such that the extended filter medium 118 at the end sides 138 is sufficiently compressed to provide a strong seal but not overly compressed such that the compression may collapse the pores of the filtering medium 115 and hinder gas flow through the filter medium 115.

Figure 3:
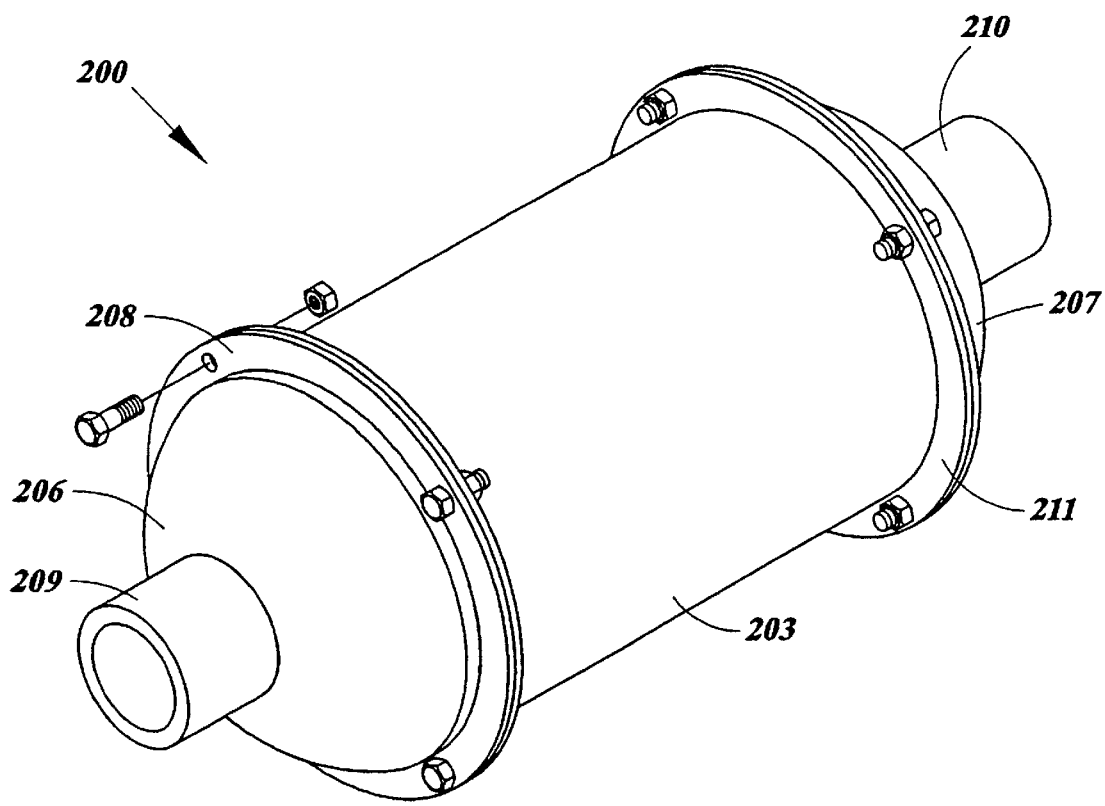
FIG. 3 is a perspective view of another exemplary filter system embodying the invention.
Figure 4:
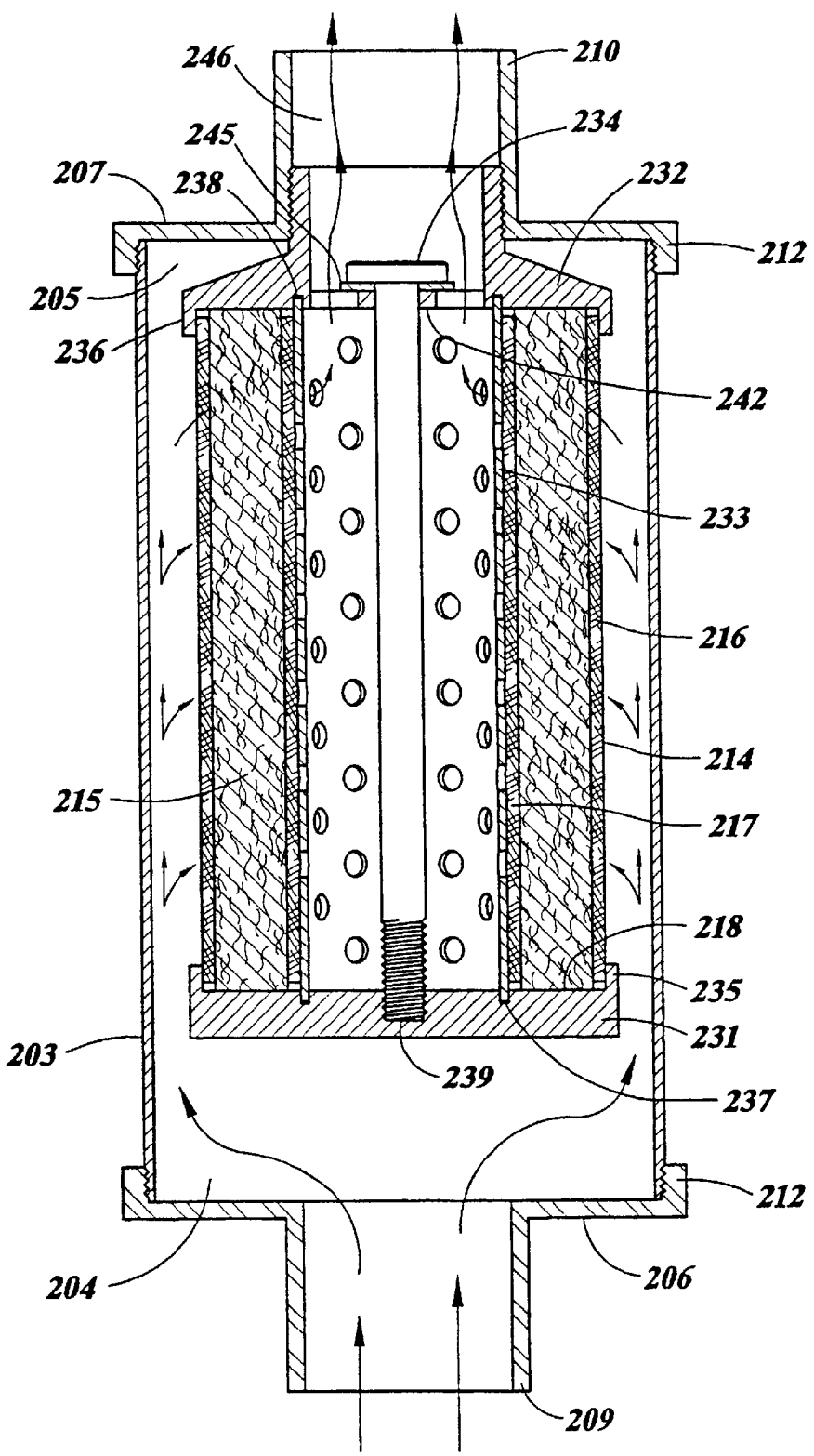
FIG. 4 is a cross-sectional view of the embodiment shown in FIG. 3.
Figure 5:
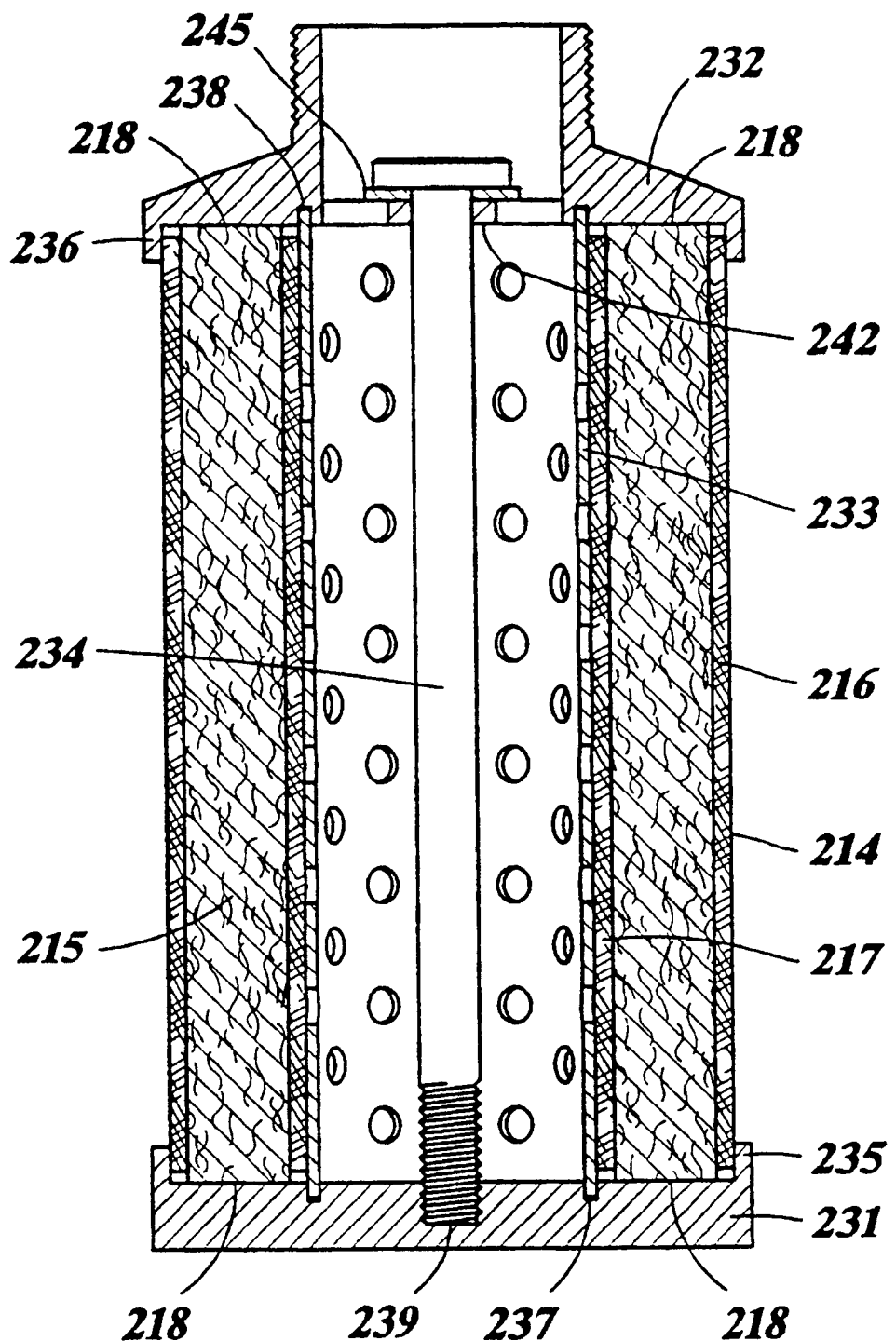
FIG. 5 is a cross-sectional view of a portion of the filter system shown in FIG. 4.

As shown in FIGS. 3, 4 and 5, another exemplary embodiment of the engine exhaust filter system 200 embodying the present invention may include a housing 202, a filter element 214 disposed in the housing 202 and a compression assembly 230. The housing 202 may be generally cylindrically configured and comprise a hollow, cylindrical body 203 having two open ends 204, 205 and two housing caps 206, 207 covering the two open ends 204, 205. The housing caps 206, 207 may be attached to the cylindrical body 203 by any suitable means. For example, as shown in FIG. 3, either or both housing caps 206, 207 may be provided with outwardly extending radial flanges 208 that are attached to the outwardly extending radial flanges 211 at the corresponding ends 204, 205 of the cylindrical body 203. The attachment may be achieved by any suitable means such as bolts or clamps. Alternatively, as shown in FIG. 4, either or both housing caps 206, 207 may include an axially extending flange 212 with internal threads, and the corresponding ends 204, 205 of the cylindrical body 203 may include external threads. The housing caps 206, 207 then may be screwed onto the cylindrical body 203.

An inlet 209 is preferably located on one of the housing caps 206, 207 and an outlet 210 is preferably located on the other housing cap, although the inlet 209 and the outlet 210 may be placed at any convenient locations on the housing 202. The exhaust gas may enter the housing 202 through the inlet 209, pass through the hollow, cylindrical body 203 from one of its open ends 204, 205 to the other open end 204, 205, and exit the housing 202 through the outlet 210. Therefore, the exhaust gas flow path of the filter system 200 may be defined by the hollow, cylindrical body 203, and it may provide fluid communication between the inlet 209 and the outlet 210.

As shown in FIG. 4, the filter element 214 of the engine exhaust filter system 200, preferably pleated, may be cylindrically configured and may comprise a filter medium 215 and two filter support members 216, 217. The filter medium 215 preferably is slightly larger than the filter support members 216, 217. Thus, when it is disposed between the filter support members 216, 217, the filter medium 215 includes a portion 218 which extends beyond the filter support members 216, 217 at at least one end of the filter element 214, preferably at both ends of the filter element 214. The extended portion 218 of the filter medium 215 can function as a seal to prevent or reduce exhaust gas bypass of the filter element 214. Again, the size of the extended portion may vary depending on various factors. The preferred size of the extended portion for the embodiments shown in FIGS. 4 and 5 is about 0.25 inch.

The cylindrical filter element 214 may be variously configured. For example, the cylindrical filter element 214 may include, as shown in FIG. 6a, a rectangular filter composite 219 with two opposite edges 220, 221 attached to each other by any suitable means, such as by welding, by the use of an adhesive or by the use of clips. If the filter element 214 is pleated, the filter composite 219 may be corrugated by any known pleating process. After corrugation, the opposing edges 220, 221 of the filter composite 219 may be attached such that the filter composite 219 forms a hollow, pleated cylindrical structure.

The filter composite 219 may include a filter medium 215 and two filter support members 216, 217, the filter medium 215 being sandwiched between the two support members 216, 217. The two attached edges 220, 221 of the filter composite 219 do not include the extended filter medium while the two unattached edges 220, 221 include the extended filter medium 218 and form the ends of the cylindrical filter element 214. The filter medium 215 may be secured between the support members 216, 217 by any suitable means. For example, as shown in FIG. 6a, a plurality of U-shaped clips 224 may be attached to each of the two edges 220, 221 of the filter composite 219. The clips 224 may be attached to the composite 219 in any manner that provides a secure attachment, including spot welding, pressure staking, swaging and crimping. Each of the clips 224 may include a plurality of prongs 225 on its inner surface, preferably along the ends, as shown in FIG. 6b. When the clips 224 are attached to the composite 219, the prongs 225 grip onto the support members 216, 217, thus securing the clips 224 to the composite 219. The prongs 225 may be variously sized, depending on factors such as the construction of the support members 216, 217. For the construction of the support members 216, 217 used in the embodiment shown in FIGS. 4 and 5, the prongs 225 preferably are 0.005 inch long and 0.005 to 0.010 inch wide. Alternatively, the composite 219 may be secured by a variety of conventional techniques without the use of clips, such as resistance or spot welding, crimping, rolling or stamping.

In a preferred method of securing the composite 219 and forming the pleated filter element 214, the opposing edges 220, 221 of a pleated filter composite 219 may be attached by, using the outer support member 216 as a clip, as shown in FIGS. 6c and 6d. As shown in FIG. 6c, the outer support member 216 may include a portion 247 extending beyond the composite 219 by a certain length such as. 0.75 inch. As shown in FIG. 6d, the extended portion 247 can be folded over the edges 220, 221. The fold may then be compressed to squeeze or crimp the support members 216, 217, thereby forming a side seal. Further, to provide an even stronger seal, a clip may be placed over the fold prior to compression.

As shown in FIGS. 4 and 5, the compression assembly 230 of the exhaust filter system 200 may include first and second end caps 231, 232, a perforated core 233, and a compressing device. The first and second end caps 231, 232 are dispose at the ends of the cylindrical filter element 214, respectively. The compressing device compresses the first and second end caps 231, 232 against the extended filter medium 218 at the ends of the filter element 214 to seal the ends of the filter element 214. The perforated core 233 may also be disposed between the end caps 231, 232 and within the filter element 214, and compressed by the compressing device. Preferably the perforated core 233 is dimensioned such that the extended filter medium 218 can be sufficiently compressed to provide a strong seal but is not overly compressed such that the compression may collapse the pores of the filtering medium and hinder gas flow through the filter medium 215. Alternatively, a perforated cage (not shown), in place of the perforated core 233, may be disposed between the end caps 231, 232 and adjacent to the outer periphery of the filter element 214 for the same purpose, or both the core 233 and the cage may be used.

A suitable compressing device may comprise a bolt 234 extending axially through the core 233 and operatively joining both end caps 231, 232. It will be appreciated that alternate mechanical compressing means may be utilized. For example, each of the end caps 231, 232 may have an outwardly extending radial flange (not shown), and one or more bolts may extend through the flanges and may be tightened to compress the filter element 214 and the core 233.

Figure 7:
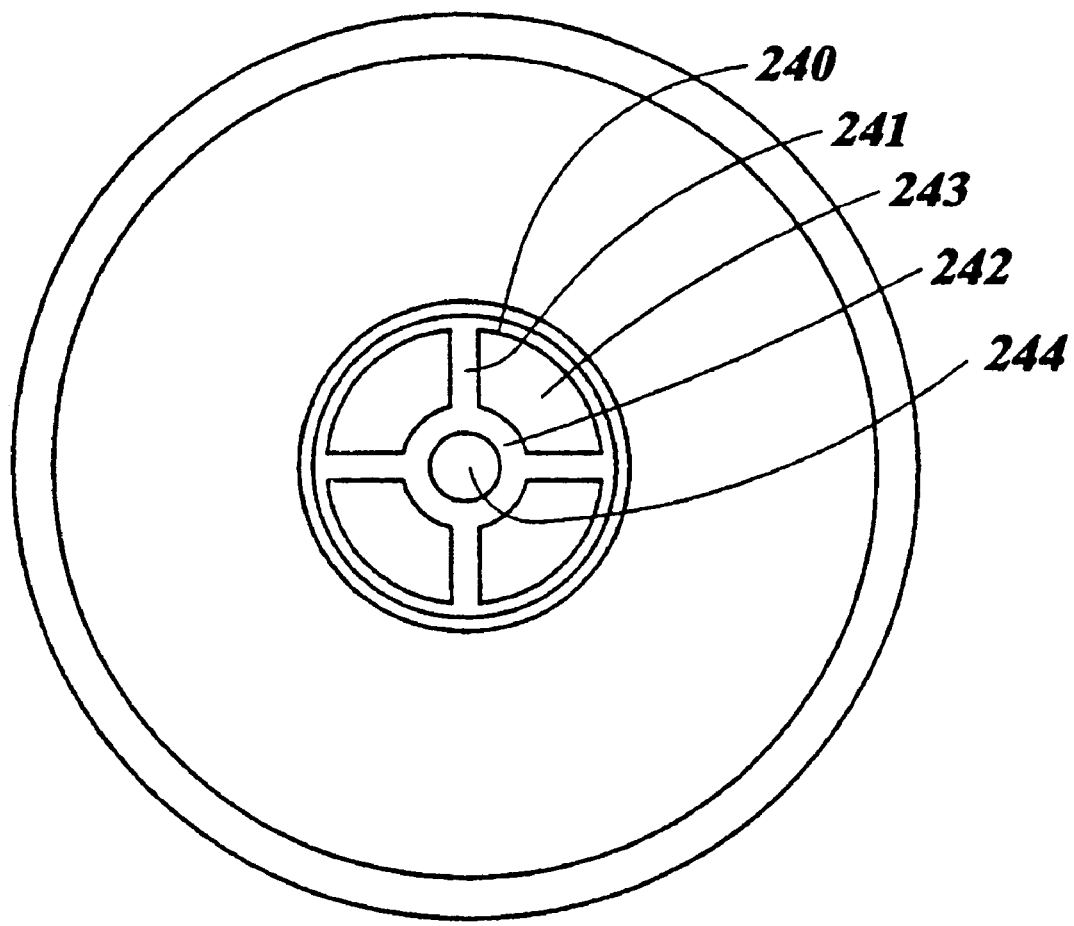
FIG. 7 is a bottom view of an embodiment of the second sealing member of the compressing assembly shown in FIG. 4.

The first end cap 231, preferably blind, may be configured in a variety of ways to receive the filter element 214, the core 233 and the bolt 234. As shown in FIGS. 4 and 5, for example, it may have an axial flange 235 on the periphery to help prevent the filter element 214 from slipping out of place when compressed, a groove 237 that may receive the core 233, and a blind, threaded bore 239 to receive the bolt 234. As with the first end cap 231, the second end cap 232 may also have an axial flange 236 to help hold the filter element 214 in place during compression, and a groove 238 that receives the core 233. The second end cap 232 is preferably configured to be an open end cap and to be able to receive the bolt at the center. For example, as shown in FIG. 7, the second end cap 232 may include a spider connector 240 that has a plurality of support arms 241 and a hub 242. The support arms 241 extend across an annular opening 243 and support the hub 242. The hub 242 includes an aperture 244 capable of receiving a bolt 234. The opening 243 allows fluid communication between the interior of the core 233 and the outlet 210. The spider connector 241 may be a unitary part of the second end cap 232, or alternatively, it may be attached to the second end cap 232 by any suitable means, such as by welding.

To compress the filter element 214, the bolt 234 is inserted axially through the aperture 244 of the second end cap 232 and screwed into the threaded bore 239 of the first end cap 231. Either or both end caps 231, 232 may include a washer 245 or other suitable means to hinder the bolt 234 from loosening. The bolt 234 may be tightened until the extended filter medium 218 of the filter element 214 is sufficiently, but not overly, compressed.

The compression assembly 230 may be secured to the housing 202 by any suitable means. For example, the outer side of the second end cap 232 may be threaded and may be coupled to a threaded opening 246 in the housing cap 207. Alternatively, the compression assembly 230 may be coupled to a flange adapter (not shown) which is then attached to the housing cap 207 or the housing 202.

A preferred path of the exhaust gas during operation is represented by the arrows in FIG. 4. The exhaust gas may enter the housing 202 from the inlet 209, flow around the first end cap 231, pass through the filter element 214 and the core 233, and then exit the housing 202 through the outlet 210. In this arrangement, the filter element 214 exhibits outside-in flow and solid contaminants, such as soot particles, are collected primarily on the outer surface of the filter element 214. Alternatively, the flow path maybe reversed, and the filter element 214 may be configured for inside-out flow.

The filter medium in the embodiments shown in FIGS. 1, 2, 4 and 5 preferably comprises one or more layers of a microporous filter medium for removing particulate pollutants, e.g., carbon and hydrocarbon particles. The filter medium is exposed to excessive temperatures, as well as hydrocarbons, chlorides, and acid forming exhaust. Consequently, the filter material preferably is resistant to high temperatures and chemical corrosion. A variety of microporous filter materials or combinations thereof are suitable for use as filter medium, including ceramic fibers and porous metal fibers. Such materials as high purity silica, aluminosilicate or borosilicate-E glass, powdered metal alloys, boron, and carbon fibers, as well as other synthetic fibrous or matrix-forming materials, may likewise be used. In general, any inorganic fibrous material that has a service temperature of at least 400° F. may be used if the material is capable of forming a filter element that will permit the efficient removal of solid pollutants, such as soot particles, at a low pressure drop. Typically, filter medium of the present invention comprises fibers having an average fiber diameter of from about 0.25 micron to about 15 microns and preferably of from about 0.5 micron to about 2.0 microns. Additionally, the filter medium is preferably fashioned as a compressible material to allow the filter medium to be compressed.

A preferred filter medium comprises borosilicate-E glass fibers which are commercially available in a variety of average fiber diameters, such as 104, 106 and 108B grade fibers which are available from Johns-Manville Corporation. The filter medium may preferably include a blend of borosilicate-E glass fibers having an average fiber diameter of 0.65 microns and a surface area of 2.3 m$^2$/g. Borosilicate-E glass fibers have a service temperature of 1200° F., a softening point of over 1500° F., and excellent chemical resistance.

Another preferred filter medium comprises quartz fiber, which is able to withstand extremely high temperatures, and has a high filtration efficiency. Quartz fibers, such as Manville Corning type 104, 106, 108, 110 grades, or blends thereof, may be used. This filter medium is advantageous in that it blends fibers from under one-half micron in diameter to four microns into a highly porous sheet with low air resistance, while retaining integrity without the addition of binders. Further, these quartz fibers have melting points over 2500° F., and a wide range of chemical resistance.

Aluminosilicate fibers or chromium-containing aluminosilicate fibers are also preferred as materials which may be used in the filter element of the present invention. These materials are commercially available in blends of very fine fibers. For instance, aluminosilicate fibers and chromium-containing aluminosilicate fibers, such as are available from Johns-Manville Corporation with an average fiber diameter of 3–4 microns, may be used in the filter element of the present invention. Aluminosilicate fibers and chromium-containing aluminosilicate fibers have melting points above 3200° F., and a wide range of chemical resistance.

In general, the support members shown in FIGS. 1, 2, 4 and 5 may include any mesh which is capable of providing support for the filter medium and which is capable of providing suitable drainage to and/or from the filter medium. Preferably, the support members are also corrugatable. Thus, it is preferred that the support members utilize a woven metal wire mesh, sintered metal fibers, or a sintered, woven metal mesh, such as RIGIMESH, a product available from Pall Corporation. Materials other than metal may also be suitable, such as aramid, graphite and PEEK (polyetheretherketone). The thickness of the wire mesh medium may be in the range from about 0.002 inches to about 0.010 inches, and mesh sizes such as 100 mesh, 90×100 mesh, 70 mesh or 42 mesh are suitable. On the upstream side of the filter medium, the thickness of the wire mesh medium preferably is 0.009 to 0.010 inch, and the mesh size preferably is 42 mesh. On the downstream side of the filter medium, the thickness of the wire mesh medium preferably is 0.009 to 0.010 inch, and the mesh size preferably is 100 mesh. Preferably, mesh sizes on both sides are small enough to retain the fibers of the filter medium but large enough to avoid creating a large pressure drop across the filter element. A porous metal media, such as PMM media, available from Pall Corporation, may likewise be suitable for use as support members.

The components of the engine exhaust filter systems shown in FIGS. 1 to 5 preferably are made of materials that can withstand chemical corrosion and engine exhaust temperature and/or regeneration temperature if regeneration is used. The components of the filter systems, other than the filter medium, are typically formed of a metal such as a carbon steel or low-alloy steel. Components made from stainless steel (e.g., 304, 316 or 347 stainless steel) or higher alloys may also be used, particularly where enhanced corrosion resistance is desired.

Additionally, in the embodiments shown in FIGS. 1 and 5, a conventional seal may be provided in addition to the seal of the present invention to provide additional sealing security. For example, high temperature adhesive may be applied between the extended portion of the filter medium and the compression surfaces of the compression assembly to provide better sealing.

A seal of the present invention has a number of advantages. For example, the seal can withstand high temperatures and are resistant to chemical corrosion. The preferred seal materials such as quartz and Borosilicate-E glass fibers have excellent chemical resistance and service temperatures that are much higher than engine exhaust temperature or exhaust filter regeneration temperature. Further, a seal of the present invention is highly reliable because a seal of the present invention is a unitary part of the filter medium and, therefore, will not easily break off from the filter medium. Additional, a seal of the present invention is cost-effective because there is generally no need for a separate seal such as a gasket seal or the application of adhesive.

I claim:

1. An engine exhaust filter comprising:
    a housing having an inlet and an outlet and defining an exhaust gas flow path between the inlet and the outlet;
    a pleated filter element disposed in the exhaust gas flow path, said pleated filter element including a filter medium and at least first perforated filter support member and comprising materials that are resistant to temperatures of 400° F. or greater, said filter medium being disposed adjacent to the perforated filter support member and including a portion extending beyond the perforated filter support member, wherein the extended portion of the filter medium comprises a seal that prevents or reduces bypass of unfiltered exhaust gas around the pleated filter element.

2. An engine exhaust filter comprising:
    a housing having an inlet and an outlet and defining an exhaust gas flow path between the inlet and the outlet;
    a pleated filter element disposed in the exhaust gas flow path, said pleated filter element including a filter medium and at least a first perforated filter support member and comprising materials that are resistant to temperatures of 400° F. or greater, said filter medium being disposed adjacent to the perforated filter support member and including a portion extending beyond the first perforated filter support member;
    a compression assembly operatively associated with the exhaust gas flow path, said compression assembly compressing the extended portion of the filter medium to form a seal, wherein said seal prevents or reduces bypass of unfiltered exhaust gas around the pleated filter element.

3. A seal for an engine exhaust filter element, the engine exhaust filter element including a filter medium and at least a first perforated filter support member disposed adjacent to the filter medium, the seal comprising:
    a portion of the filter medium extending beyond the perforated filter support member, whereby the seal prevents or reduces bypass of unfiltered exhaust gas around the pleated filter element.

4. The engine exhaust filter according to claim 1 wherein the pleated filter element comprises a cylindrically configured pleated filter element.

5. The engine exhaust filter according to claim 1 wherein the pleated filter element comprises a flat pleated filter element.

6. The engine exhaust filter according to claim 1 wherein the filter medium comprises an inorganic fibrous material.

7. The engine exhaust filter according to claim 1 wherein the filter medium comprises borosilicate glass fibers.

8. The engine exhaust filter according to claim 1 wherein the filter medium comprises quartz fibers.

9. The engine exhaust filter according to claim 2 wherein the pleated filter element comprises a cylindrically configured pleated filter element.

10. The engine exhaust filter according to claim 2 wherein the pleated filter element comprises a flat pleated filter element.

11. The engine exhaust filter according to claim 2 wherein the filter medium comprises an inorganic fibrous material.

12. The engine exhaust filter according to claim 2 wherein the filter medium comprises borosilicate glass fibers.

13. The engine exhaust filter according to claim 2 wherein the filter medium comprises quartz fibers.

14. The engine exhaust filter according to claim 2 wherein the compression assembly comprises a first and a second end caps, a perforated core and a compressing device.

15. The engine exhaust filter according to claim 14 wherein the compressing device comprises a bolt extending axially through the perforated core and operatively joining the first and second end caps.

16. The engine exhaust filter according to claim 2 wherein the compression assembly comprises a parallelepipedal body, first and second housing caps and a tie rod.

17. The seal according to claim 3 further comprising a conventional seal disposed between the compressed portion of the filter medium and at least one of the surfaces compressing the filter medium.

* * * * *